Nov. 2, 1954     H. A. SILVEN ET AL     2,693,062
GRINDING MACHINE
Filed April 29, 1953     2 Sheets-Sheet 1

INVENTORS
HERBERT A. SILVEN
STEWART S. MADER
BY
Harold W. Eaton
ATTORNEY

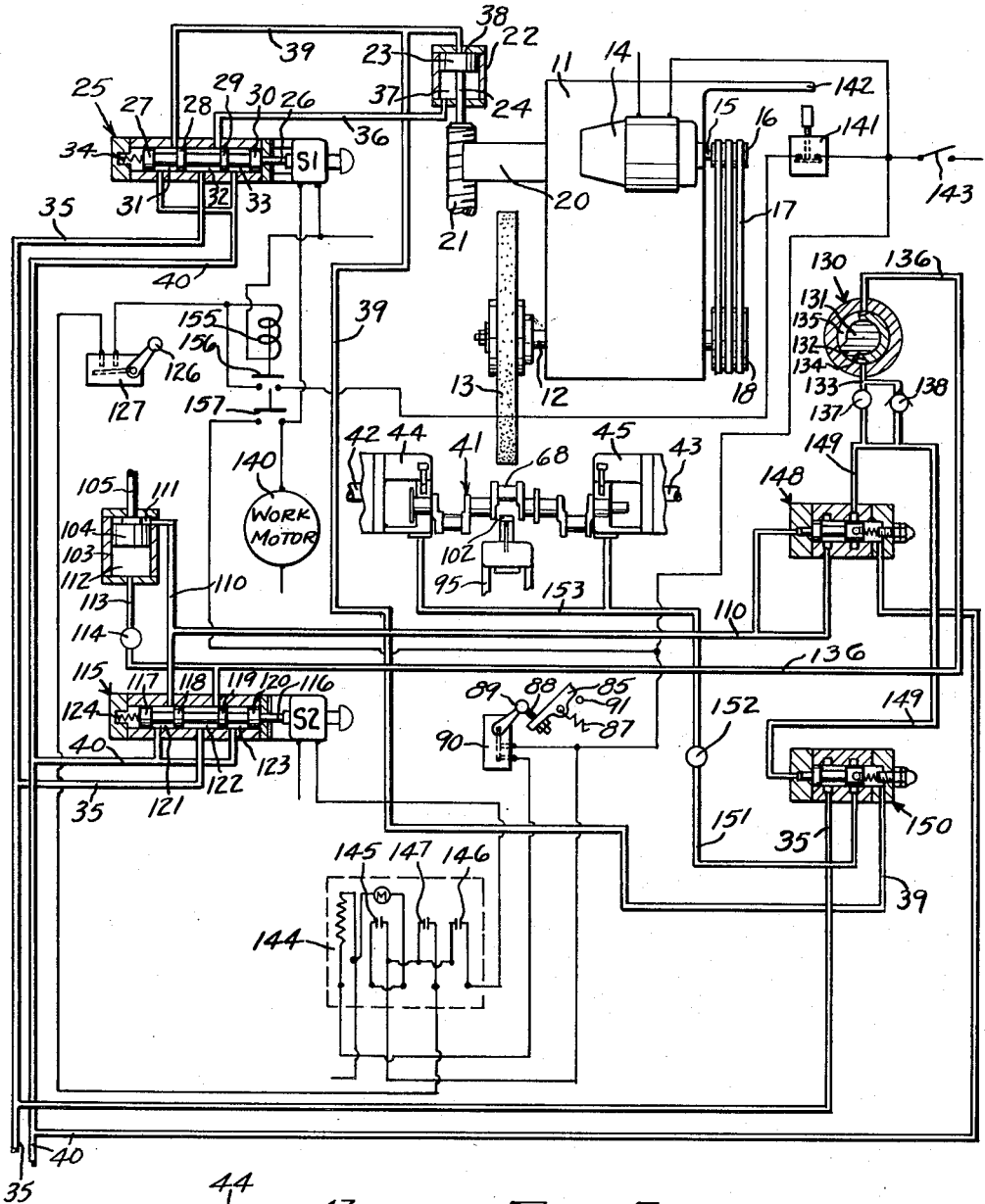
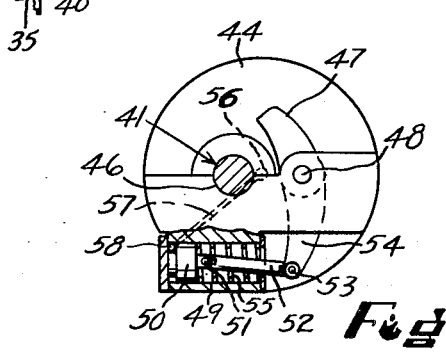
Fig. 5
Fig. 6
INVENTORS
HERBERT A. SILVEN
STEWART S. MADER
BY Harold W. Eaton
ATTORNEY

United States Patent Office 2,693,062
Patented Nov. 2, 1954

2,693,062

GRINDING MACHINE

Herbert A. Silven and Stewart S. Mader, Worcester, Mass., assignors to Norton Company, Worcester, Mass., a corporation of Massachusetts Application April 29, 1953, Serial No. 351,792

9 Claims. (Cl. 51—105)

The invention relates to grinding machines, and more particularly to a work piece locating mechanism for locating a work piece in an axial direction relative to the grinding wheel.

One object of the invention is to provide a simple and thoroughly practical work positioning mechanism axially to position a rotatable work piece relative to the work supporting chucks and the grinding wheel. Another object is to provide a work positioning mechanism for positioning a work piece having spaced shouldered portions thereon in an axial direction to position the portion of the work piece to be ground in alignment with the operative face of the grinding wheel so as to facilitate equalizing the side grinding of the wheel on spaced shouldered portions of the work piece. Another object is to provide a movable work locating device including a rotatable cam which is arranged to be swung into an operative position relative to the work piece and then to be rotated to cause an axial positioning movement thereof. A further object is to provide a hydraulically operated mechanism for moving a cam position mechanism into an operative position, and also to impart an axial positioning stroke thereto. A further object is to provide a hydraulic motor for swinging the positioning cam into an operative position, and a second hydraulic motor thereafter to impart a rotary motion to the work positioning cam. Other objects will be in part obvious or in part point out hereinafter.

In the accompanying drawings in which is shown one of various possible embodiments of the mechanical features of the invention:

Fig. 5 is a combined hydraulic diagram of the actuating mechanisms and the controls therefor; and Fig. 6 is an end elevation, partly in section of one of the work supporting pot chucks.

Figure 2:
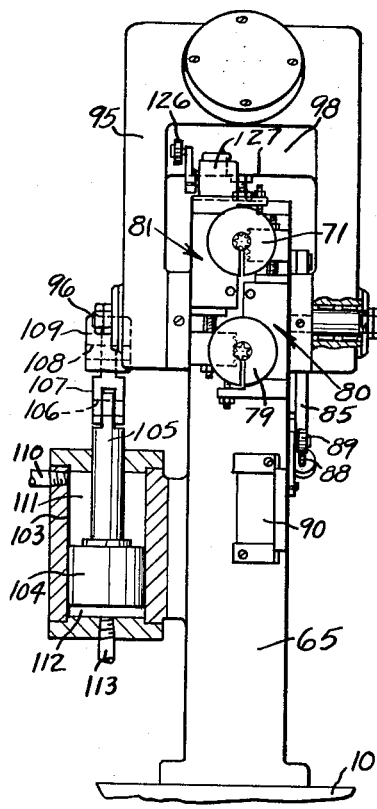
Fig. 2 is a front elevation of steady rest and crankshaft positioning mechanism, showing the actuating piston and cylinder in section.

This invention is particularly applicable to a crankpin grinding machine, such as that shown in the prior U. S. patent to Herbert A. Silven No. 2,151,666 dated March 21, 1939 to which reference may be had for details of disclosure not contained herein.

As illustrated in the drawings, a machine base 10 serves as a support for a transversely movable grinding wheel slide 11. The wheel slide 11 is provided with a rotatable wheel spindle 12 journalled in suitable bearings (not shown). The spindle 12 serves as a support for a grinding wheel 13 which is arranged to grind a cylindrical portion on a work piece, such as, the crankpins or main bearings of a crankshaft to be ground. A suitable driving mechanism is provided for the grinding wheel 13 comprising an electric motor 14 mounted on the upper surface of the wheel slide 11. The motor 14 is provided with an armature shaft 15 having a multiple V-groove pulley 16 thereon. The pulley 16 is connected by multiple V-belts 17 with a multiple V-groove pulley 18 mounted on the right hand end of the wheel spindle 12 (Fig. 5).

A grinding wheel feeding mechanism is provided for imparting a transverse feeding movement to the wheel slide 11. This mechanism may comprise a half nut 20 fixedly mounted on the under side of the wheel slide 11. The half nut 20 meshes with or engages a rotatable feed screw 21. A power operated mechanism is provided for rapidly moving the wheel slide to and from an operative position comprising a hydraulic cylinder 22 which is arranged in axial alignment with the feed screw 21. The cylinder 22 contains a slidably mounted piston 23 connected to one end of a piston rod 24. The other end of the piston rod 24 is operatively connected to the feed screw 21.

A feed control valve 25 is provided for controlling the admission to and exhaust of fluid from the cylinder 22. The control valve 25 is preferably a piston type control valve comprising a valve stem 26 having plurality of valve pistons 27, 28, 29 and 30 formed integrally therewith. The valve pistons 27, 28, 29 and 30 form a plurality of valve chambers 31, 32 and 33. A compression spring 34 serves normally to maintain the valve stem 26 in a right hand end position (Fig. 5). A solenoid S1 is operatively connected to the valve stem 26 and arranged so that when energized, the solenoid shifts the valve stem 26 toward the left into a reverse position.

Fluid under pressure is supplied from any suitable source through a pipe 35. In the position of the valve 25 (Fig. 5), fluid under pressure from the pipe 35 enters the valve chamber 32 and passes through a pipe 36 into a cylinder chamber 37 to cause a rearward movement of the piston 23 to move the wheel slide 11 and the grinding wheel 13 into a rearward or inoperative position. During this movement, fluid within a cylinder chamber 38 may exhaust through a pipe 39, through the valve chamber 31 and through an exhaust pipe 40 into a reservoir (not shown). The mechanism above described serves to cause a rapid approaching movement of the grinding wheel for moving the wheel to and from an operative position. For obtaining a grinding feed, the feed screw 21 may be rotated by a conventional type feeding mechanism either manually or by power. This feeding mechanism may be identical with that shown in the prior U. S. patent to H. A. Silven, et al., No. 2,522,485, dated September 12, 1950, to which reference may be had for details of disclosure not contained herein.

The base 10 also serves as a support for a rotatable work supporting mechanism for supporting and rotating a work piece such as a crankshaft 41 to be ground. As illustrated in the drawings a pair of spaced axially aligned rotatable work spindles 42 and 43 are provided. A pair of pot chucks 44 and 45 are mounted on the adjacent ends of the work spindles 42 and 43 respectively. The pot chucks 44 and 45 serve rotatably to support the opposite ends of the crankshaft 41 to be ground. The pot chucks 44 and 45 are identical in construction, consequently only the pot chuck 44 has been illustrated in detail in Fig. 6. The pot chuck 44 is provided with a fixedly mounted half bearing 46 for supporting one end of the crankshaft 41 to be ground. The pot chuck 44 is provided with a clamping jaw 47 which is pivotaly supported by a stud 48 fixedly mounted on the pot chuck 44. A hydraulically operated mechanism is provided for actuating the clamping jaw 47 comprising a cylinder 49 fixedly mounted on the pot chuck 44. The cylinder 49 contains a slidably mounted piston 50 which is connected by a stud 51 with one end of a link 52. The other end of the link 52 is connected by a stud 53 with a downwardly extending portion 54 of the clamping jaw 47. A compression spring 55 is contained within the cylinder 49 and is interposed between the piston 50 and the right hand end cap of the cylinder 49. The spring 55 serves normally to maintain the clamping jaw 47 in an unclamped position.

When it is desired to clamp the crankshaft 41 into the pot chucks 44 and 45, fluid under pressure is passed through a central axial passage 56 within the spindles 42 and 43 respectively, through a passage 57 into a cylinder chamber 58 formed at the left hand end of the cylinder 49 to cause the piston 50 to move toward the right (Fig .6) so as to lock the clamping jaw 47 in a counter-clockwise direction to clamp the ends of the crankshaft 41 into engagement with the bearing surface 46 of the pot chucks 44 and 45 respectively.

Figure 1:
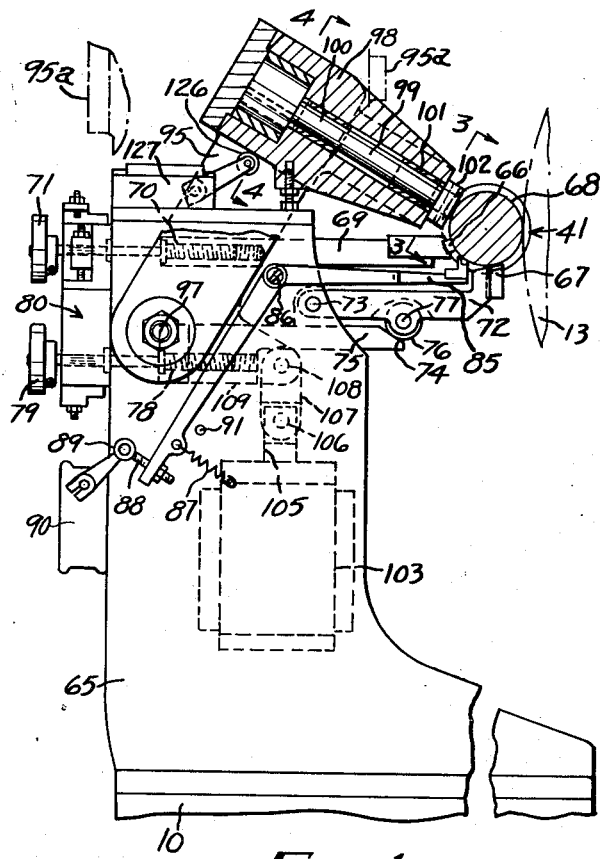
Fig. 1 is a side elevation of a steady rest, showing the crankshaft positioning mechanism in section.

A work steadying rest is provided for steadying the crankshaft 41 during a grinding operation. The steady rest may comprise a base 65 which may be mounted on a work table in the conventional manner, or as shown in Figs. 1 and 2 may be mounted on the base 10. The steady rest base 65 serves as a support for a pair of steady rest shoes 66 and 67 for steadying and supporting a crankpin 68 on the crankshaft 41 during a grinding operation. The steady rest shoe 66 is supported on a horizontally movable slide 69 which is slidably mounted on the steady rest base 65. An adjusting screw 70 having an actuating knob 71 is operatively connected to adjust the slide 69 to facilitate positioning the work steadying shoe 66 and maintaining it in operative engagement with the crankpin 68 during a grinding operation.

The lower steady rest shoe 67 is supported on a pivotally mounted arm 72 supported on a stud 73 on the steady rest base 65. A cam 74 formed on a horizontally movable slide 75 is arranged to engage a roller 76 supported by a stud 77 on the arm 72. An adjusting screw 78 having an actuating knob 79 is provided to facilitate adjusting the position of the slide 75 and the cam 74 to vary the position of the arm 72 and the steady rest shoe 67 to facilitate maintaining the shoe 67 in operative engagement with the crankpins 68 during a grinding operation. By manipulation of the knobs 71 and 79, the work steadying shoes 66 and 67 respectively may be maintained in the desired supporting engagement with the crankpin 68 being ground.

A spring and fluid actuated mechanism may be provided for moving the steady rest shoes 66 and 67 automatically and away from engagement with the crankpin 68 and to maintain the shoes in operative engagement therewith during a grinding operation. This mechanism may comprise a spring actuated hydraulic mechanism 80 for actuating the steady rest shoe 66 and a similar spring actuated hydraulic mechanism 81 may be provided for actuating the steady rest shoe 67 in a manner substantially the same as that shown in prior U. S. patent to H. A. Silven, No. 2,567,620, dated September 11, 1950, to which reference may be had for details of disclosure not contained herein.

A work engaging feeler 85 is pivotally mounted on a stud 86 carried by the steady rest base 65. A tension spring 87 serves normally to exert a tension on the feeler 85 tending to rock the feeler in a counter-clockwise direction and to hold it in engagement with a stop stud 91. The feeler 85 is arranged in a path of the crankpin 68 to be ground so that when the crankshaft 41 is loaded into an operative position in the grinding machine, the crankpin 68 will engage the feeler 85 and rock it in a clockwise direction against the tension of the spring 87. During the rocking movement of the feeler 85, an adjustably mounted screw 88 on the feeler arm 85 is arranged to engage an actuating roller 89 of a normally open limit switch 90 to close a circuit to be hereinafter described.

Figure 3:
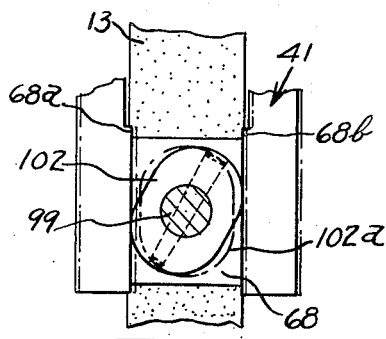
Fig. 3 is a cross sectional view, on an enlarged scale, taken approximately on the line 3—3 of Fig. 1, through the crankshaft positioning mechanism.
Figure 4:
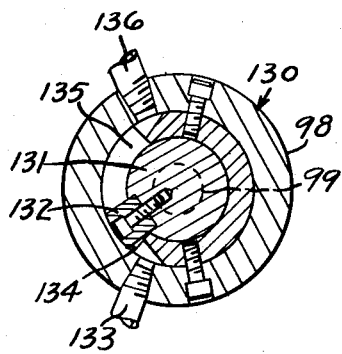
Fig. 4 is a cross sectional view, on an enlarged scale, taken approximately on the line 4—4 of Fig. 1, showing the rotary fluid motor for turning the positioning cam.

In the grinding of crankpins, it is desirable to position the crankshaft 41 in an axial direction so that the opposed shoulders or cheeks 68a and 68b will be centered relative to the side faces of the grinding wheel 13 so as to equalize the side grinding of the wheel as it is fed into operative engagement with the crankpin 68 to be ground. As the wheel 13 approaches the crankpin 68, the corner portions of the wheel grind the cheeks 68a and 68b before the periphery of the wheel 13 engages the periphery of the crankpin 68 to be ground. In the preferred form, it is desirable to position the crankshaft 41 in an axial direction after it has been placed in supporting engagement with the pot chucks 44 and 45 respectively, but before the clamping jaws 47 have moved into a clamped position. This mechanism may comprise a pivotally mounted U-shaped frame 95 which straddles the upper part of the steady rest base 65. The frame 95 is supported by a pair of opposed aligned studs 96 and 97. A housing 98 is formed integral with the frame 95 and contains a rotatable shaft 99 journalled in spaced bearings 100 and 101. An oval shaped cam 102 is fixedly mounted on the right hand end of the shaft 99. The short axis of the oval being somewhat less than the distance between the cheeks or shoulders 68a and 68b while the long axis of the oval is greater than the distance between the cheeks or shoulders 68a and 68b. The oval shaped cam 102 is normally in a broken line position 102a (Fig. 3).

A hydraulically operated mechanism is provided for swinging the frame 95 from an operative position 95a as shown in broken lines in Fig. 1 into an operative full line position as indicated. This mechanism may comprise a cylinder 103 which is fixedly mounted to steady rest base 65. The cylinder 103 contains a slidably mounted piston 104 which is fastened to the lower end of a piston rod 105. The upper end of the piston rod 105 is connected by a stud 106 with a link 107. The upper end of the link 107 is connected by a stud 108 with an arm 109 formed integral with the frame 95. It will be readily apparent from the foregoing disclosure that when fluid is passed through a pipe 110 into a cylinder chamber 111, the piston 104 will be moved downwardly into the position illustrated in Fig. 2 to cause a clockwise swinging movement of the frame 95 from the broken line position 95a into the full line position 95 as shown in Fig. 1. During this movement fluid within a cylinder chamber 112 may exhaust through a pipe 113. A throttle valve 114 is provided in the pipe line 113 to facilitate controlling the rate of movement of the piston 104.

A control valve 115 is provided for controlling the admission to and exhaust of fluid from the cylinder 103. This valve is preferably a piston type valve comprising a valve stem 116 having a plurality of valve pistons 117, 118, 119 and 120 formed integrally therewith. The valve pistons 117, 118, 119 and 120 are spaced so as to form valve chambers 121, 122 and 123. A compression spring 124 serves normally to hold the valve stem 116 in a right hand end position. A solenoid S2 is provided which when energized serves to shift the valve stem 116 toward the left into a reverse position. In the position of the valve 115 (Fig. 5) fluid under pressure from the pressure line 35 passes through the valve chamber 122, through a pipe 125, through the throttle valve 114, the pipe 113, into the cylinder chamber 112 to cause the piston 104 to move upwardly so as to rock the frame 95 in a counter-clockwise direction into the broken line position 95a (Fig. 1). During this movement fluid within the cylinder chamber 111 may exhaust through the pipe 110, through the valve chamber 121 and exhaust through the exhaust pipe 40.

When the solenoid S2 is energized and the valve stem 116 shifted into a left hand end position fluid under pressure entering the valve chamber 122 passes through the pipe 110 into the cylinder chamber 111 to cause a downward movement of the piston 104 which serves to swing the frame 95 from the broken line position 95a into an operative position as illustrated in Fig. 1.

During the swinging movement of the frame 95 to an operative position, the housing 98 engages an actuating roller 126 of a normally open limit switch 127 to close the same. The mechanism above described serves to move the housing 98 so as to move the cam 102 to and from an operative position between the cheeks or shoulders 68a—68b of the crankpin 68.

A suitable mechanism is provided for imparting a rotary motion to the shaft 99 and the cam 102. This mechanism may comprise a rotary type fluid motor 130 formed integral with the housing 98. The rotary fluid motor 130 comprises a rotor 131 which as illustrated is formed integral with the shaft 99. The rotor 131 is provided with a single vane 132. When fluid under pressure is passed through a pipe 133 into a chamber 134, a clockwise rotary motion is imparted to the vane 132 and the rotor 131 to impart a corresponding clockwise rotation to the cam 102. The cam 102 moves from the broken line position 102a (Fig. 3) into the full line position 102 (Fig. 3). During this rotary motion of the cam 102 the periphery of the cam will engage one or the other of the cheeks or shoulders 68a or 68b and impart an axial positioning movement to the crankshaft 41 so as to center the cheeks or shoulders 68a—68b relative to the side faces of the grinding wheel 13 to facilitate equalizing the side grinding of the wheel as it is moved toward the axis of the crankpin 68 to be ground. The steady rest base 65 is positioned on the base 10 so that the axis of the shaft 99 coincides with a midplane of the grinding wheel 13.

During the clockwise rotation of the vane 132 and the rotor 131 fluid within a motor chamber 135 may exhaust through a pipe 136. A throttle valve 137 is provided in the pipe line 133 to facilitate controlling the rate of rotation of the rotor 131 and the vane 132. A ball check valve 138 is provided so that when fluid is exhausted through the pipe 133 from the motor 130, exhausting fluid may bypass the throttle valve 137. The motor 130 is designed so that the vane 132 may rotate through a maximum of approximately 90°.

A work driving motor 140 (Fig. 5) is provided for synchronously rotating the work spindles 42 and 43 in a manner substantially the same as that shown in the prior patent above referred to. Normally closed limit switch 141 is arranged in the path of a projection 142 on the wheel slide 11 for maintaining a holding circuit in a manner to be hereinafter described.

The apparatus above described has been shown with a crankshaft 41 loaded into an operative position in the pot chucks 44 and 45 but with the electric power off. When it is desired to start a cycle, a manually operable switch 143 is closed. The closing of the switch 143 serves to start the driving motor 14. The closing of the switch 143 serves through the limit switch 90, now closed by actuation of the feeler 85, to energize an electric timer 144. The timer 144 may be any of the well known commercial timers, such as, for example the Microflex timer manufactured by the Signal Electric Corporation of Moline, Illinois. Energizing the timer 144 serves to close a pair of contactors 145 which serve to close a holding circuit. Contactors 146 are closed and contactors 147 remain open. The closing of contactors 146 serve to energize the solenoid S2 to shift the valve stem 116 toward the left so that fluid under pressure is passed through the pipe 110 to cause a downward movement of the piston 104 thereby swinging the frame 95 into the full line position as shown in Fig. 1 with the cam 102 located between the cheeks or shoulders 68a and 68b of the crankpin 68. During the swinging movement of the frame 95, the normally open limit switch 127 is closed. Fluid under pressure passing through the pipe 110 also passes to a sequence valve 148 which serves after a delay to pass fluid through a pipe 149, through the throttle valve 137, through the pipe 133 into the motor chamber 134 to cause a clockwise rotation of the rotor 131 and the vane 132 thereby rotating the cam 102 precisely to position the crankshaft 41 in an axial direction to center the cheeks or shoulders 68a—68b relative to the side faces of the grinding wheel 13. Fluid under pressure passing through the pipe 149 also passes to a second sequence valve 150 which serves after a predetermined interval to pass fluid under pressure from the pipe 35 through a pipe 151, through a throttle valve 152 and through a pipe 153 to the pot chucks 44 and 45 simultaneously to actuate the clamping jaws 47 on both of the pot chucks to clamp the opposite ends of the crankshaft 41 therein.

When the timer 144 times-out, the contactors 146 open thereby deenergizing the solenoid S2 so that the cam 102 is rotated in a counter-clockwise direction into its initial position as shown in broken lines 102a in Fig. 3 and at the same time serves to rock the frame 95 in a counter-clockwise direction into the broken line position 95a (Fig. 1). At the same time when the timer 144 times-out, the contactors 147 close which completes a circuit through the, now closed, limit switch 127 to energize a relay switch 155. Energizing relay switch 155 serves to close a pair of contactors 156 and 157. The closing of contactors 156 serves to set up a holding circuit to maintain the switch 155 energized. The closing of contactors 157 serves to start the work drive motor 140 synchronously to rotate the spindles 42 and 43 together with the pot chucks 44 and 45 respectively so as to impart a rotary motion to the crankshaft 41 to be ground. The closing of contactors 157 serves also to energize the solenoid S1 to shift the valve stem 26 toward the left so that fluid under pressure from the pressure line 35 is passed through the pipe 39 into the cylinder chamber 38 to cause a forward feeding movement of the wheel slide 11. The rapid approaching movement of the slide 11 and the grinding feed thereof continues until the crankpin 68 has been ground to a predetermined size at which time the projection 142 on the wheel slide 11 opens the normally closed limit switch 141 thereby breaking the holding circuit to deenergize the relay switch 155 thereby causing a rearward movement of the wheel slide 11 and at the same time stopping the work driving motor 140.

When the solenoid S1 is energized to pass fluid under pressure through the pipe 39 into cylinder chamber 38 to initiate a forward movement of the wheel slide 11 and grinding wheel 13, fluid also passes from the pipe 39 into chamber at the right hand end of the sequence valve 150 to return the sequence valve into the position illustrated in Fig. 5 so that fluid within the pipe 35 passes through the sequence valve 150 and through the pipe 151 to maintain the clamping jaws 47 in a clamped condition during a grinding operation.

When the wheel slide 11 reaches its forwardmost position, that is, when the crankpin 68 has been ground to the desired predetermined diameter, the projection 142 opens the normally closed limit switch 141 to break the holding circuit for the relay switch 155 thereby deenergizing the relay switch 155 and breaking the contactors 156 and 157. Breaking the contactors 157 serves to deenergize the solenoid S1 allowing the valve stem 26 to shift toward the right under the compression of the spring 34 into the position illustrated in Fig. 5 so that fluid under pressure from the pressure pipe 35 passes through the pipe 36 into the cylinder chamber 37 to cause the piston 23 to move rearwardly so as to withdraw the wheel slide 11 and the grinding wheel 13 to a rearward or initial position. The breaking of the contactors 157 serves also to stop the work drive motor 140.

The operation of this improved crankshaft positioning mechanism will be readily apparent from the foregoing disclosure. A crankshaft 41, having a crankpin 68 to be ground, is placed in position in the pot chucks 44 and 45. The placing of the crankshaft 41 in the pot chucks 44 and 45 serves to rock the feeler arm 85 so as to close the normally open limit switch 90. The switch 143 may then be closed to close a circuit to energize the timer 144 thereby closing the timer contactors 145 and 146. The closing of the contactors 146 energizes the solenoid S2 to shift the valve stem 116 toward the left so as to pass fluid through the pipe 110 into the cylinder chamber 111 to rock the frame 95 in a clockwise direction to position the operative face of the cam 102 between the cheeks 68a—68b of the crankpin 68. Fluid under pressure in the pipe 110 passes to the sequence valve 148 to actuate the same and thereafter to pass fluid into the chamber 134 of the fluid motor 130 to impart a clockwise rotary motion to the rotor 131 and to the positioning cam 102 axially to position the crankshaft 41 so that the cheeks or shoulders 68a—68b are centered relative to the operative face of the grinding wheel 13. Movement of the frame 95 to an operative position closes the limit switch 127 so that when the timer times-out and the contactors 147 close, a circuit will be completed to energize the relay switch 155 which serves in a manner above described to start the work drive motor 140 and also to energize the solenoid S1 to start a forward feeding movement of the grinding wheel. When the timer 144 times-out, the contactors 146 open thereby deenergizing the solenoid S2 so that the valve 115 is shifted into the position illustrated in Fig. 5 to cause the frame 95 to swing in a counter-clockwise direction into an inoperative position and also to rotate the rotor 131 of the fluid motor 130 in a counter-clockwise direction so as to return the positioning cam 102 into the broken line position 102a (Fig. 3) so that it is ready for the next cycle.

The forward movement of the wheel slide 11 and grinding wheel 13 continues until the crankpin 68 has been ground to the desired predetermined size at which time the projection 142 on the wheel slide 11 opens the normally closed limit switch 141 to break the holding circuit thereby deenergizing the relay switch 155 to open the contactors 156 and 157. The opening of the contactor 157 serves to stop the work drive motor 140 and also to deenergize the solenoid S1 to shift the valve stem 26 toward the right into the position illustrated in Fig. 5 so that fluid under pressure is passed into the cylinder chamber 37 to cause a rearward movement of the wheel slide 11 and grinding wheel 13 to an inoperative position. When the control valve 25 shifts into this position fluid within the pot chuck cylinders may exhaust through the pipe 153, through the throttle valve 152, through the pipe 151, through the right hand end chamber of the sequence valve 150, through the pipe 39, through the valve chamber 31 of the control valve 25 and exhausts through the pipe 40 thereby unclamping the crankshaft 41 so that it may be removed from the pot chucks 44 and 45. When the crankshaft 41 is removed from the pot chucks, the released tension of the spring 86 rocks the feeler arm 85 in a counter-clockwise direction to open the normally open limit switch 90 thereby breaking the circuit and allowing the timer 144 to reset for the next grinding cycle.

It will thus be seen that there has been provided by the invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

We claim:

1. In a grinding machine having a base, a transversely movable rotatable grinding wheel thereon, a rotatable work support on said base including a pair of spaced axially aligned rotatable pot chucks to support the opposite ends of a work piece to be ground, and a work positioning mechanism for axially positioning the grinding wheel and the work piece having spaced shoulder portions comprising a movably mounted frame on said base, a rotatable cam, means including a fluid motor to move said frame to position said cam into an operative position between said shoulders, and means including a fluid motor to rotate said cam into engagement with said shoulders axially to position the work piece relative to the grinding wheel.

2. In a grinding machine having a base, a transversely movable rotatable grinding wheel thereon, a rotatable work support on said base including a pair of spaced axially aligned rotatable pot chucks to support the opposite ends of a work piece to be ground, and a work positioning mechanism for axially positioning the grinding wheel and the work piece having spaced shoulder portions comprising a pivotally mounted frame on said base, a cam rotatably supported on said frame, means including a fluid motor to swing said frame to and from an operative position to position said cam between said shoulders, and means including a fluid motor on said frame to rotate said cam into engagement with said shoulders axially to position the work piece relative to the grinding wheel.

3. In a grinding machine having a base, a transversely movable rotatable grinding wheel thereon, a rotatable work support including a pair of spaced axially aligned rotatable pot chucks to support the opposite ends of a work piece to be ground, and a work positioning mechanism for axially positioning the grinding wheel and the work piece having spaced shoulder portions comprising a work steady rest on said base for steadying the work piece during a grinding operation, a pivotally mounted frame on said steady rest, a cam rotatably supported on said frame, means including a fluid motor on said steady rest operatively connected to swing said frame to and from an operative position to position said cam between said shoulders, and means including a fluid motor on said frame to rotate said cam into engagement with said shoulders axially to position the work piece relative to the grinding wheel.

4. In a grinding machine, as claimed in claim 1, in combination with the parts and features therein specified of a control valve operatively connected to control the admission to and exhaust of fluid from both of said fluid motors, and a sequence valve operatively connected between the control valve and the second fluid motor to delay actuation of the second fluid motor until the frame has been moved into an operative position.

5. In a grinding machine having a base, a transversely movable rotatable grinding wheel thereon, means to feed said wheel in either direction, a work support on said base including a pair of spaced axially aligned rotatable pot chucks for supporting and rotating a work piece to be ground, and a work positioning mechanism for relatively locating the grinding wheel and a work piece having spaced shoulder portions comprising a rotatable cam, a pivotally mounted frame to support said cam, means including a fluid motor operatively connected to swing said frame to and from an operative position to position said cam between said shoulders, and means including a rotary fluid motor on said frame operatively connected to impart a rotary motion to said cam so as to cause an axial positioning movement of the work piece relative to the pot chucks to center the portion of the work piece to be ground relative to the operative face of the grinding wheel.

6. In a grinding machine having a base, a transversely movable rotatable grinding wheel thereon, means to feed said wheel in either direction, a work support on said base including a pair of spaced axially aligned rotatable pot chucks for supporting and rotating a work piece to be ground, a clamping jaw on each of said chucks, a piston and cylinder on each of said chucks for actuating said jaws, and a work positioning mechanism for relatively locating the grinding wheel and a work piece having spaced shoulder portions comprising a rotatable cam, a pivotally mounted frame to support said cam, means including a fluid motor operatively connected to swing said frame to and from an operative position to position said cam between said shoulders, and means including a rotary fluid motor on said frame operatively connected to impart a rotary motion to said cam so as to cause an axial positioning movement of the work piece relative to the pot chucks to center the portion of the work piece to be ground relative to to the operative face of the grinding wheel before the clamping jaws are actuated.

7. In a grinding machine, as claimed in claim 6, in combination with the parts and features therein specified of a control valve to control the admission to and exhaust of fluid from both of said fluid motors, a sequence valve interposed between the control valve and the second motor which is arranged to delay actuation of the second motor until the cam is in an operative position, and a second sequence valve interposed between the first sequence valve and the pot chuck cylinders to delay actuation of the clamping jaw until said cam has positioned the work piece relative to the grinding wheel.

8. In a grinding machine having a base, a transversely movable rotatable grinding wheel thereon, means including a fluid motor to feed said wheel transversely in either direction, a solenoid-actuated control valve therefor, a work support on said base including a pair of spaced axially-aligned rotatable pot chucks, a clamping jaw on each of said chucks, a piston and cylinder on each of said chucks for actuating said jaws, means including an electric motor synchronously to rotate said pot chucks, a relay switch operatively connected to control the solenoid valve and the work motor, and a work positioning mechanism for relatively locating the grinding wheel and work piece having spaced shoulder portions comprising a rotatable cam, a pivotally mounted frame to support said cam, means including a fluid motor operatively connected to swing said frame to and from an operative position to position said cam between said shoulders, a rotary fluid motor on said frame operatively connected to impart a rotary motion to said cam to cause an axial positioning movement of the work piece relative to the pot chucks to center the portion of the work base to be ground relative to the operative face of the grinding wheel, a solenoid actuated control valve for controlling said fluid motor and said rotary motor and a sequence valve interposed between said latter valve and the rotary motor to delay operation of said rotary motor and a second sequence valve interposed between the first sequence valve and the pot chuck cylinders to delay clamping action until the crankshaft has been positioned.

9. In a grinding machine, as claimed in claim 8, in combination with the parts and features therein specified of a pivotally mounted work engaging feeler actuated by a work piece when loaded into the pot chucks, a limit switch actuated thereby, an electric timer energized by said switch, said timer serving when energized to actuate said second control valve to initiate a work piece positioning movement, and operative connections between said timer and said relay switch which is arranged at time-out to start said work drive motor and to initiate a forwarding cycle of the grinding wheel after the work piece has been positioned.

References Cited in the file of this patent

UNITED STATES PATENTS

| Number | Name | Date |
| --- | --- | --- |
| 880,731 | Hall | Mar. 3, 1908 |
| 2,047,406 | Copping | July 14, 1936 |
| 2,214,677 | North | Sept. 10, 1940 |
| 2,543,564 | Bakewell | Feb. 27, 1951 |